United States Patent
Wang

(10) Patent No.: US 11,318,942 B2
(45) Date of Patent: May 3, 2022

(54) TRAVEL SPEED CONTROL METHOD, APPARATUS, COMPUTING DEVICE, AND STORAGE MEDIUM

(71) Applicant: TENCENT TECHNOLOGY (SHENZHEN) COMPANY LIMITED, Shenzhen (CN)

(72) Inventor: Bin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 258 days.

(21) Appl. No.: 16/558,057

(22) Filed: Aug. 31, 2019

(65) Prior Publication Data
US 2019/0382014 A1    Dec. 19, 2019

Related U.S. Application Data

(63) Continuation of application No. PCT/CN2018/101038, filed on Aug. 17, 2018.

(30) Foreign Application Priority Data

Aug. 22, 2017 (CN) .......................... 201710725387.0

(51) Int. Cl.
*B60W 30/18* (2012.01)
*B60W 40/072* (2012.01)

(52) U.S. Cl.
CPC .......... *B60W 30/18* (2013.01); *B60W 40/072* (2013.01); *B60W 2400/00* (2013.01); *B60W 2552/30* (2020.02); *B60W 2720/106* (2013.01)

(58) Field of Classification Search
None
See application file for complete search history.

(56) References Cited

U.S. PATENT DOCUMENTS 7,774,121 B2 *   8/2010  Lee ..................... B60W 30/143
                                                                701/70
9,533,574 B2 *   1/2017  Park ................. B60W 30/18145
(Continued)

FOREIGN PATENT DOCUMENTS

CN    102001338 A    4/2011
CN    103376118 A    10/2013
(Continued)

OTHER PUBLICATIONS

The Japan Patent Office (JPO) Notification of Reasons for Refusal for Application No. 2020-510587 and Translation dated Mar. 9, 2021 6 Pages.

(Continued)

*Primary Examiner* — Todd Melton
(74) *Attorney, Agent, or Firm* — Anova Law Group, PLLC

(57) ABSTRACT

This application relates to a travel speed control method, an apparatus, a computing device, and a storage medium. The method includes: determining a sampling interval matching a current traveling speed; selecting, starting from a current location, sampling points on an expected traveling route according to the sampling interval; determining a target curvature according to curvatures of the expected traveling route at the respective sampling points; determining, according to the target curvature, a speed limit of traveling on the expected traveling route; and controlling a traveling speed according to the speed limit.

13 Claims, 8 Drawing Sheets

(56) References Cited

U.S. PATENT DOCUMENTS

| | | | |
|---|---|---|---|
| 9,885,578 B2* | 2/2018 | Mizuno | G01C 21/20 |
| 2010/0049400 A1 | 2/2010 | Duraiswamy et al. | |
| 2012/0209489 A1 | 8/2012 | Saito et al. | |
| 2013/0332044 A1 | 12/2013 | Um et al. | |
| 2014/0309837 A1 | 10/2014 | Ham | |
| 2015/0134222 A1 | 5/2015 | Ham | |
| 2015/0151756 A1 | 6/2015 | Han | |
| 2017/0364083 A1 | 12/2017 | Yang et al. | |
| 2018/0186373 A1 | 7/2018 | Liu et al. | |
| 2018/0265084 A1 | 9/2018 | Inou et al. | |

FOREIGN PATENT DOCUMENTS

| | | |
|---|---|---|
| CN | 103481889 A | 1/2014 |
| CN | 104097640 A | 10/2014 |
| CN | 104670208 A | 6/2015 |
| CN | 106114507 A | 11/2016 |
| CN | 104670234 B | 5/2017 |
| CN | 106740868 A | 5/2017 |
| CN | 108297876 A | 7/2018 |
| JP | H07234991 A | 9/1995 |
| JP | H0950597 A | 2/1997 |
| JP | 2006244284 A | 9/2006 |
| JP | 2017102827 A | 6/2017 |
| KR | 101338592 B1 | 12/2013 |
| WO | 2011048865 A1 | 4/2011 |
| WO | 2015178842 A1 | 11/2015 |

OTHER PUBLICATIONS

The World Intellectual Property Organization (WIPO) International Search Report for PCT/CN2018/101038 dated Nov. 5, 2018 8 Pages (including translation).

The State Intellectual Property Office of the People's Republic of China (SIPO) Office Action 1 for 201710725387.0 dated Apr. 16, 2019 9 Pages (including translation).

The European Patent Office (EPO) The Extended European Search Report for 18847584.2 dated Sep. 29, 2020 6 Pages.

Korean Intellectual Property Office (KIPO) Office Action 1 for 20197031001 dated Dec. 29, 2020 9 Pages (including translation).

* cited by examiner

TRAVEL SPEED CONTROL METHOD, APPARATUS, COMPUTING DEVICE, AND STORAGE MEDIUM

RELATED APPLICATION

This application claims priority to PCT Application No. PCT/CN2018/101038, filed on Aug. 17, 2018, which in turn claims priority to Chinese Patent Application No. 201710725387.0, entitled "TRAVEL SPEED CONTROL METHOD, APPARATUS, COMPUTING DEVICE, AND STORAGE MEDIUM" filed with the Chinese Patent Office on Aug. 22, 2017. The two applications are incorporated by reference in their entirety.

FIELD OF THE TECHNOLOGY

This application relates to the field of driving control technologies, and in particular, to a travel speed control method, an apparatus, a computing device, and a storage medium.

BACKGROUND OF THE DISCLOSURE

With rapid development of science and technologies, technologies about driving control are increasingly advanced, and automated driving is drawing more attention. To ensure safety of driving, during automated driving, a speed limit of a road is determined for speed planning, thereby ensuring safe driving.

When calculating a driving speed, a corner route is often segmented first, and a speed limit value of each segment is calculated in advance and recorded on a map. When a vehicle is traveling through the corner, speed limits recorded on the map in a segmented manner are queried. Often, an abrupt acceleration or deceleration is likely to occur at a boundary between two segments with different speed limits, resulting in a sudden speed changes. For example, if a speed limit of a road segment is 100 km/s, and a next road segment is relatively curved and has a speed limit of 60 km/s, a sudden speed change may occur at the connecting point of the two road segments.

SUMMARY

One aspect of the present disclosure provides a method for controlling travel speed. The method includes: determining a sampling interval matching a current traveling speed; selecting, starting from a current location, sampling points on an expected traveling route according to the sampling interval; determining a target curvature according to curvatures of the expected traveling route at the respective sampling points; determining, according to the target curvature, a speed limit of traveling on the expected traveling route; and controlling a traveling speed according to the speed limit.

Another aspect of the present disclosure provides a travel speed control apparatus. The apparatus includes a sampling interval determining module, configured to determine a sampling interval matching a current traveling speed; a sampling point selection module, configured to select, starting from a current location, sampling points on an expected traveling route according to the sampling interval; a target curvature determining module, configured to determine a target curvature according to curvatures of the expected traveling route at the respective sampling points; a speed limit determining module, configured to determine, according to the target curvature, a speed limit of traveling on the expected traveling route; and a travel speed control module, configured to control a traveling speed according to the speed limit.

Another aspect of the present disclosure provides a vehicle with a travel speed control apparatus. The travel speed control apparatus includes a sampling interval determining module, configured to determine a sampling interval matching a current traveling speed of the vehicle; a sampling point selection module, configured to select, starting from a current location, sampling points on an expected traveling route according to the sampling interval; a target curvature determining module, configured to determine a target curvature according to curvatures of the expected traveling route at the respective sampling points; a speed limit determining module, configured to determine, according to the target curvature, a speed limit of traveling on the expected traveling route for the vehicle; and a travel speed control module, configured to control a traveling speed of the vehicle according to the speed limit.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1A:
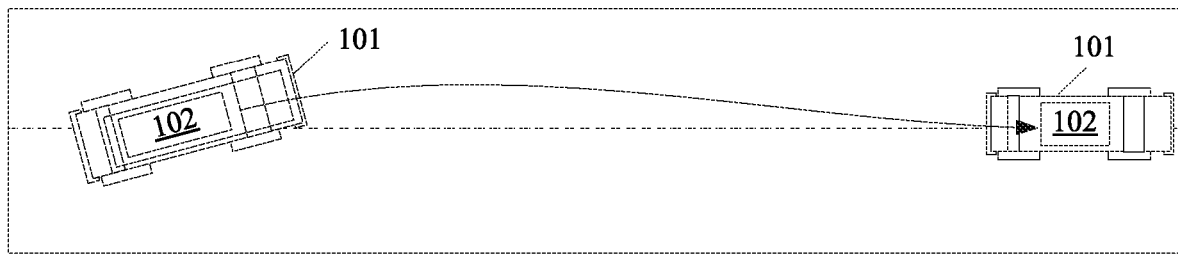
FIG. 1A is a schematic diagram of a system architecture involved in some embodiments of this application.
Figure 1B:
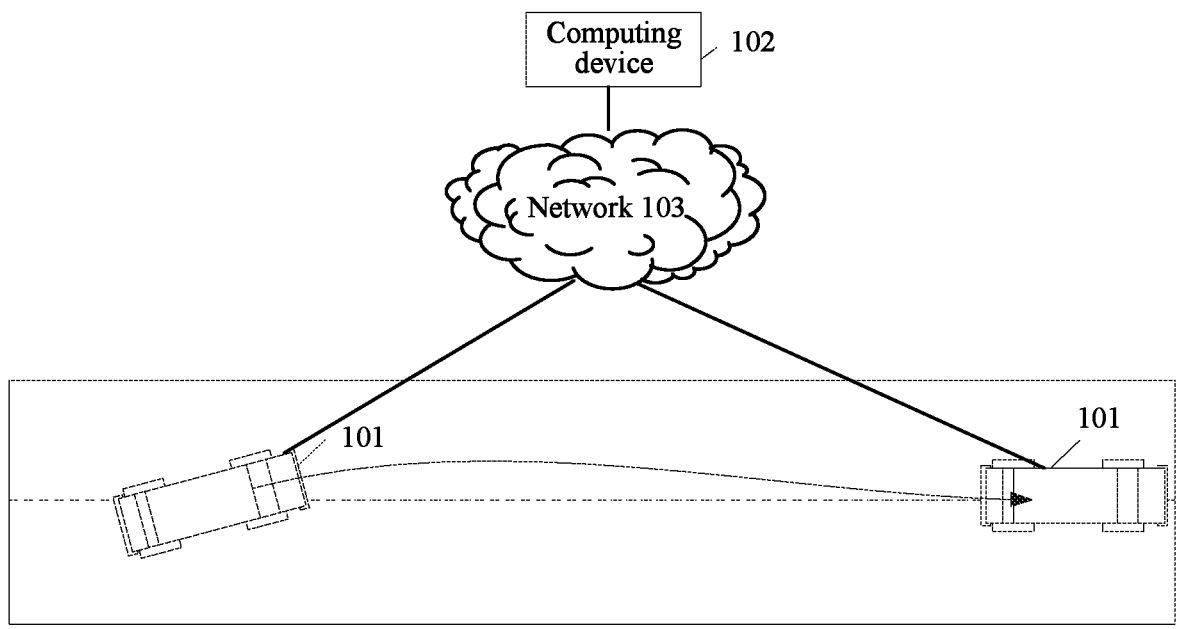
FIG. 1B is a schematic diagram of a system architecture involved in some other embodiments of this application.

This application provides a travel speed control method, applicable to a system architecture shown in FIG. 1A and FIG. 1B. As shown in FIG. 1A and FIG. 1B, the system architecture includes: a vehicle 101 and a computing device 102. The computing device 102 may be a computer terminal or a server. In some embodiments, the computing device 102 is a terminal, and the computing device 102 may be located in the vehicle 101. The computing device 102 may be integrated in the vehicle 101, and for example, may be an operating system of the vehicle 101 or a device independent of the vehicle 101. As shown in FIG. 1A, when the computing device 102 is a server, the vehicle 101 may be connected to the computing device 102 through a network 103, as shown in FIG. 1B. In some embodiments, when the vehicle 101 is in an automated driving mode, the computing device 102 may determine a sampling interval matching a current traveling speed; select, starting from a current location, sampling points on an expected traveling route according to the sampling interval; determine a target curvature according to curvatures of the expected traveling route at the respective sampling points; determine, according to the target curvature, a speed limit of traveling on the expected traveling route; and control a traveling speed of the vehicle 101 according to the speed limit, thereby ensuring safe driving of the vehicle 101.

Figure 1C:
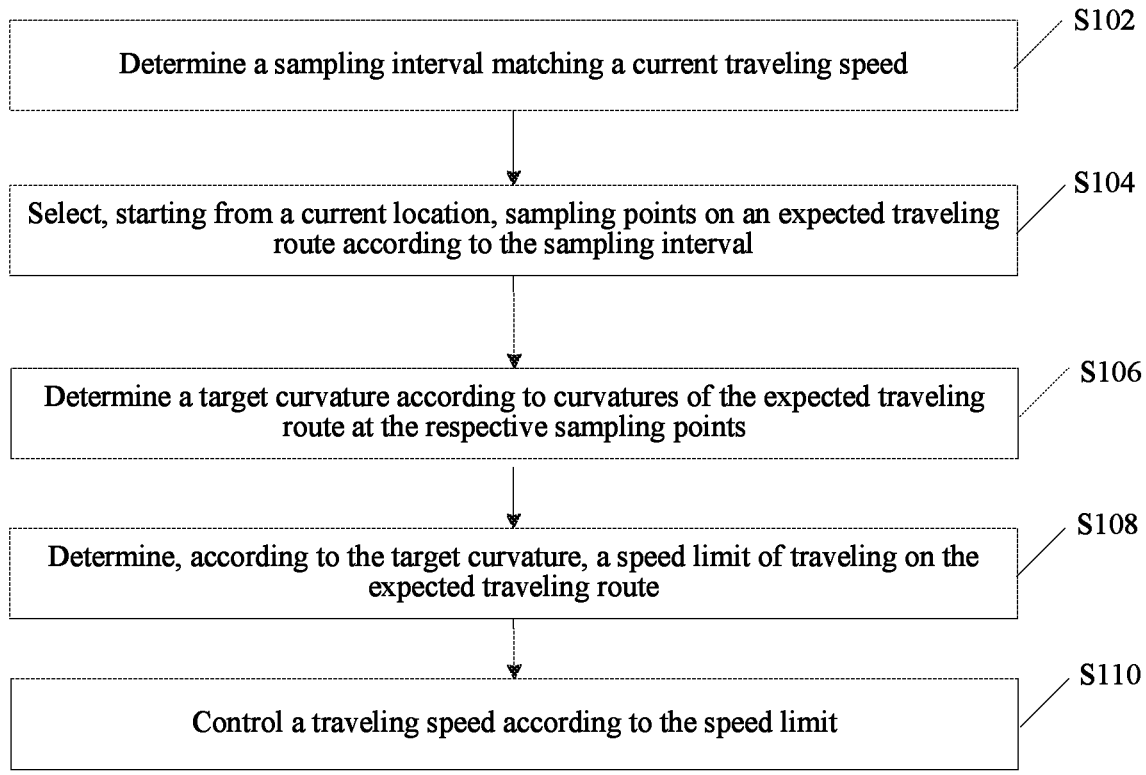
FIG. 1C is a schematic flowchart of a travel speed control method In one embodiment of this application.

FIG. 1C is a schematic flowchart of a travel speed control method In one embodiment of this application. In this embodiment, applying the travel speed control method to a computing device is mainly used as an example for description. The computing device may be a terminal or a server. Referring to FIG. 1C, the method specifically includes the following steps.

S102: Determine a sampling interval matching a current traveling speed.

The sampling interval matching the current traveling speed indicates that the current traveling speed affects a size of the sampling interval.

In one embodiment, the sampling interval is positively correlated to the current traveling speed. Specifically, if the current traveling speed is higher, the sampling interval is larger; and if the current traveling speed is lower, the sampling interval is smaller.

In one embodiment, step S102 includes: obtaining a current traveling speed and a preset time length; and determining a sampling interval according to a product of the current traveling speed and the preset time length.

Specifically, In one embodiment, the computing device may directly use the product of the current traveling speed and the preset time length as the sampling interval. In another embodiment, the determining a sampling interval according to a product of the current traveling speed and the preset time length includes: determining the product of the current traveling speed and the preset time length; obtaining a preset sampling interval; and obtaining a minimum value of the product of the current traveling speed and the preset time length and the preset sampling interval as the sampling interval.

In one embodiment, the computing device may obtain the sampling interval according to the following formula:

$$d = \mathrm{MIN}(d_0, V^*t_0),$$

where d is the sampling interval, $d_0$ is the preset sampling interval, V is the current traveling speed, and $t_0$ is the preset time length. In one embodiment, $d_0$ may be 10 m, and $t_0$ may be 0.5 s.

For example, if the current traveling speed V is 15 m/s, $d_0$ is 10 m, and $t_0$ is 0.5 s, $V^*t_0=7.5$ m, and then, $d=\mathrm{MIN}(d_0, V^*t_0)=\mathrm{MIN}(10, 7.5)=7.5$ m.

In another embodiment, step S102 includes: determining a preset traveling speed range within which the current traveling speed falls, and searching for, according to a correspondence between the preset traveling speed range and a sampling interval, the sampling interval corresponding to the preset traveling speed range within which the current traveling speed falls.

Specifically, the correspondence between the traveling speed range and the sampling interval is preset in the computing device. The computing device may determine the traveling speed range within which the current traveling speed falls, and searching for the sampling interval corresponding to the determined traveling speed range according to the correspondence, that is, determining the sampling interval matching the current traveling speed.

For example, if the traveling speed falls within a range of 20 to 25 m/s, a corresponding sampling interval is 10 m, if the traveling speed falls within a range of 26 to 30 m/s, a corresponding sampling interval is 15 m, and if a traveling speed falls within a range of 31 to 35 m/s, a corresponding sampling interval is 30 m. If the current traveling speed is 28 m/s, a range within which the current traveling speed falls is 31 to 35 m/s, and further, a matched sampling interval is 30 m.

S104: Select, starting from a current location, sampling points on an expected traveling route according to the sampling interval.

The expected traveling route is a route that is predicted to be traveled on. The expected traveling route may be a route formed by a road ahead of a vehicle in a current traveling direction.

Specifically, the computing device may select, starting from a current location, sampling points on an expected traveling route according to the sampling interval. For example, a preset quantity may be 5.

The computing device may alternatively determine a quantity of samples matching the current traveling speed and select, starting from a current location and based on the determined quantity of samples, sampling points on an expected traveling route according to the sampling interval. In one embodiment, the quantity of samples is positively correlated to the current traveling speed.

S106: Determine a target curvature according to curvatures of the expected traveling route at the respective sampling points.

A curvature of the expected traveling route at a sampling point represents a value of a degree by which the expected traveling route deviates from a tangent of the sampling point, that is, a value of a bending degree of the expected traveling route at the sampling point. A larger curvature indicates a larger degree by which the expected traveling route deviates from the tangent of the sampling point, that is, a larger bending degree of the expected traveling route at the point. The target curvature is a curvature finally used to determine a speed limit (that is, a maximum speed) of traveling on the expected traveling route.

Specifically, the computing device may select a maximum curvature from curvatures at the respective sampling points, and determine the target curvature according to the selected maximum curvature. In one embodiment, the computing device may directly select the maximum curvature as the target curvature. In another embodiment, the computing device may alternatively obtain an average value of the selected maximum curvature and curvatures at the auxiliary points, and determine the target curvature according to the average value of the curvatures.

S108: Determine, according to the target curvature, a speed limit of traveling on the expected traveling route.

The speed limit of traveling on expected traveling route is a maximum speed of traveling on the expected traveling route.

In one embodiment, step S108 includes: obtaining a preset lateral force coefficient; obtaining an absolute value of the target curvature; and dividing a product of the lateral force coefficient and the acceleration of gravity by the absolute value of the target curvature and then extracting a square root to obtain the speed limit of traveling on the expected traveling route.

A lateral force coefficient is a used to measure a degree of stability of a traveling object when the traveling object travels on a traveling route.

Specifically, the computing device may obtain a speed limit of traveling on the expected traveling route according to the following formula:

$$V\max = \text{sqrt}(u*g/\text{fabs}(k_A)), \text{ where}$$

Vmax is a speed limit of traveling on the expected traveling route; u is a lateral force coefficient; g is the acceleration of gravity; $k_A$ is a target curvature; sqrt(u*g/fabs($k_A$)) represents performing calculation to extract a square root from u*g/fabs($k_A$); fabs($k_A$) represents obtaining an absolute value of $k_A$. In one embodiment, the lateral force coefficient u may be 0.2.

S110: Control a traveling speed according to the speed limit.

Specifically, the computing device may perform speed planning according to the speed limit, and determine a speed of traveling on the expected traveling route.

In the foregoing travel speed control method, the sampling interval matches the current traveling speed, and sampling points are selected on the expected traveling route according to the sampling interval, so that the sampling point are more likely to reflect requirements of travel speed control at the current traveling speed. Determining the target curvature according to the curvatures at the selected sampling point can better reflect a bending status of the expected traveling route, so that a corner can be found in advance, and further, a speed limit is determined according to a curvature of the corner, thereby accurately controlling a traveling speed and reducing sudden speed changes.

Figure 2:
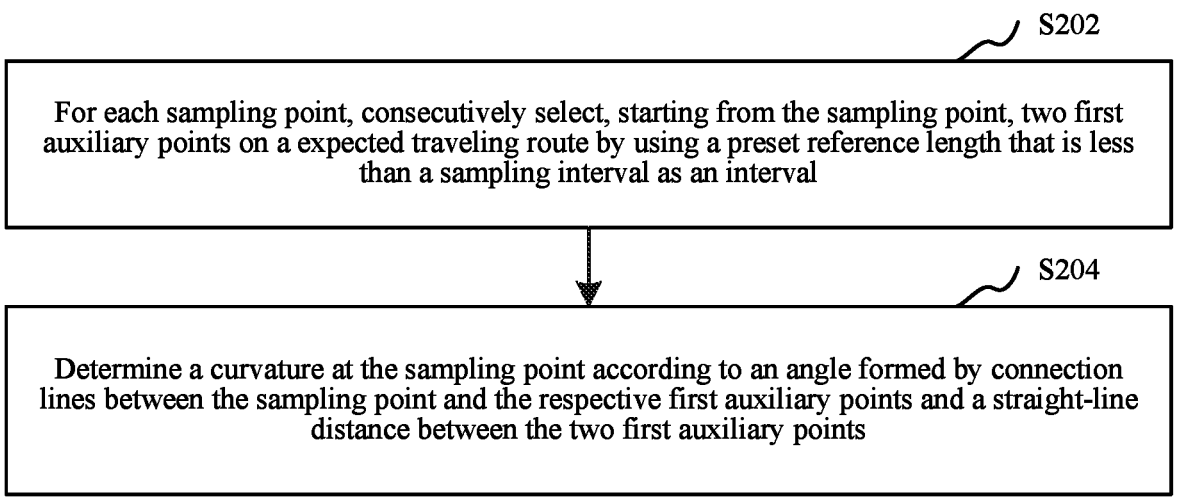
FIG. 2 is a schematic flowchart of a sampling point curvature determining step In one embodiment of this application.

As shown in FIG. 2, In one embodiment, before step S106, the method further includes a sampling point curvature determining step, specifically including the following steps:

S202: For each sampling point, consecutively select, starting from the sampling point, two first auxiliary points on the expected traveling route by using a preset reference length that is less than the sampling interval as an interval.

The preset reference length is less than the sampling interval. It may be understood that because two first auxiliary points are consecutively selected starting from the sampling point by using the preset reference length on the expected traveling route, and an arc length between the sampling point and the first auxiliary point, and an arc length between two first auxiliary points are both preset reference lengths.

In one embodiment, the preset reference length may be a vehicle axle length. The vehicle axle length is a distance from a center of a front axle of a vehicle to a center of a rear axle of the vehicle.

S204: Determine a curvature at the sampling point according to an angle formed by connection lines between the sampling point and the respective first auxiliary points and a straight-line distance between the two first auxiliary points.

An angle may be formed by connection lines between the sampling point and the respective corresponding first auxiliary points. The straight-line distance between the two first auxiliary points is a length of a line segment between the two first auxiliary points.

In one embodiment, the computing device may determine curvatures at respective sampling points according to the following method:

$$K_s = 2*\sin(\theta/2)/L, \text{ where}$$

$K_s$ is a curvature at a sampling point, and $\theta$ is an angle formed by connection lines between the sampling point and respective corresponding first auxiliary points; and L is a straight-line distance between two first auxiliary points.

It may understand that when the preset reference length is a vehicle axle length, because the vehicle axle length is relatively short, an arc length between two first auxiliary points is approximately equal to a straight-line distance between two first auxiliary points, the vehicle axle length may be directly substituted as L into the formula above for calculation.

Figure 3:
FIG. 3 is a schematic diagram of curvature calculation In one embodiment of this application.

FIG. 3 is a schematic diagram of curvature calculation In one embodiment. As shown in FIG. 3, P1, P2, P3, and P4 are sampling points, and a point A and a point B are first auxiliary points corresponding to P1 on an expected traveling route w. The preset reference length between the first auxiliary point and the sampling point P1 is less than the sampling interval between the two sampling points, and $\theta$ is an angle formed by connection lines between the sampling point P1 and the corresponding first auxiliary points, namely, the point A and the point B.

In the foregoing embodiment, for each sampling point, two first auxiliary points on the expected traveling route are consecutively selected, starting from the sampling point, by using a preset reference length that is less than the sampling interval as an interval. A curvature at the sampling point is determined according to an angle formed by connection lines between the sampling point and the respective first auxiliary points and a straight-line distance between the two first auxiliary points. During curvature calculation, by making two first auxiliary points, a relatively complex calculus curvature calculation method is converted into direct calculation between an angle and a distance, which simplifies processing steps and improves efficiency of obtaining curvatures at sampling points, thereby improving efficiency of driving speed control.

Figure 4:
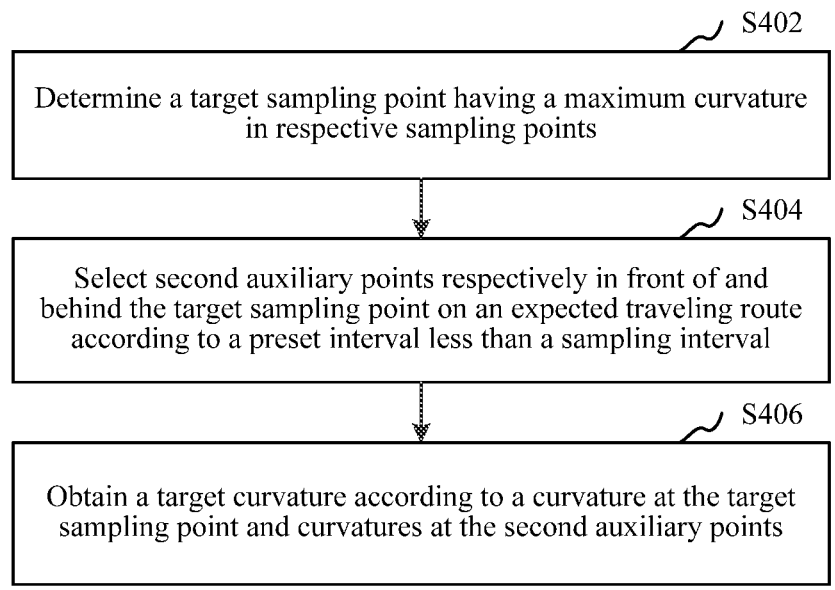
FIG. 4 is a schematic flowchart of a target curvature obtaining step In one embodiment of this application.

As shown in FIG. 4, In one embodiment, step S106 (the target curvature obtaining step for short) specifically includes the following steps.

S402: Determine a target sampling point having a maximum curvature in the respective sampling points.

The target sampling point is a sampling point having a maximum curvature in the respective sampling points.

Specifically, the computing device may determine curvatures at respective sampling points, and selects a sampling point having a maximum curvature from the respective sampling points as the target sampling point.

S404: Select second auxiliary points respectively in front of and behind the target sampling point on the expected traveling route according to a preset interval shorter than the sampling interval.

The preset interval is less than the sampling interval. It may be understood that an arc length between the second auxiliary point in front of the target sampling point and the target sampling point and an arc length between the second auxiliary point behind the target sampling point and the target sampling point are both equal to the preset interval. The second auxiliary point in front of the target sampling point is a point selected, starting from the target sampling point, on the expected traveling route according to the preset interval in a direction opposite to a traveling direction. The second auxiliary point behind the target sampling point is a point selected, starting from the target sampling point, on the expected traveling route according to the preset interval in the traveling direction.

In one embodiment, at least one second auxiliary point in front of or behind the target sampling point is selected. A same quantity of second auxiliary points may be selected in front of or behind the target sampling point. It may be understood that when a plurality of second auxiliary points is selected in front of or behind the target sampling point, an arc length between every two adjacent second auxiliary points is equal to the preset interval.

S406: Obtain the target curvature according to a curvature at the target sampling point and curvatures at the second auxiliary points.

In another embodiment, the computing device may alternatively obtain an average value of a curvature at the target sampling point and curvatures at the second auxiliary points, and determine the target curvature according to the obtain average value of the curvatures.

Specifically, the computing device may obtain a sum of the curvature at the target sampling point and curvatures at the second auxiliary points, and divide the sum by a quantity of the summed curvatures, to obtain an average value of the curvature at the target sampling point and the curvatures at the second auxiliary points.

In one embodiment, the computer obtains an average value of the curvature at the target sampling point and the curvatures at the second auxiliary points according to the following formula:

$$K_R = (K_{F\_pre} + K_s + K_{F\_next})/n, \text{ where}$$

$K_R$ is an average value of a curvature at a target sampling point and curvatures at second auxiliary points; $K_{F\_pre}$ is a curvature at a second auxiliary point in front of the target sampling point; $K_s$ is the curvature at the target sampling point; $K_{F\_next}$ is a curvature at a second auxiliary point behind the target sampling point; and n is a quantity of curvatures to be summed. In one embodiment, if only one second auxiliary point is separately selected in front of and behind the target sampling point $K_s$, n is 3.

In another embodiment, the computing device may directly use the obtained average value of the curvature at the target sampling point and the curvatures at the second auxiliary points as the target curvature. In another embodiment, the computing device may alternatively use the obtained average value of the curvature at the target sampling point and the curvatures at the second auxiliary points as the target curvature as a current reference curvature and obtain the target curvature with reference to a historical reference curvature.

In the foregoing embodiment, a sampling point having a maximum curvature is first determined, and second auxiliary points are selected at a preset interval in front of or behind the sampling point having the maximum curvature, and a target curvature is determined according to a curvature at a target sampling point and curvatures at the second auxiliary points. A target curvature obtained with reference to the curvatures at the two auxiliary points in front and behind is more stable, and compared with a limitation of a curvature at a single sampling point, can reflect a bending status of a traveling route more accurately, so that a corner can be found in advance, an further, accurate travel speed control is achieved by determining a speed limit based on a curvature of the corner, thereby reducing sudden speed changes and interference caused by speed planning.

In one embodiment, step S406 includes: generating a current reference curvature according to an average value of the curvature at the target sampling point and the curvatures at the second auxiliary points; obtaining a historical reference curvature; and using an average value of the current reference curvature and the obtained historical reference curvature as the target curvature.

The historical reference curvature is a reference curvature generated before the current reference curvature. It may be understood that a reference curvature is generated each time a speed limit is calculated, and the historical reference curvature is a reference curvature generated during speed limit calculation before the current speed limit calculation.

In another embodiment, the computing device may directly use the obtained average value of the curvature at the target sampling point and the curvatures at the second auxiliary points as the current reference curvature. The computing device may obtain all or some historical reference curvatures. The computing device may obtain an average value of the current reference curvature and the obtained historical reference curvature, and use the average value as the target curvature.

In the foregoing embodiment, during target curvature calculation, a target curvature is determined with reference to the current reference curvature and the historical reference curvature or by obtaining an average value of the current reference curvature and the historical reference curvature, so that the determined target curvature is more stable, which, compared with a limitation of being monotonously based on the current reference curve, can reflect a bending status of a traveling route more accurately.

Figure 5:
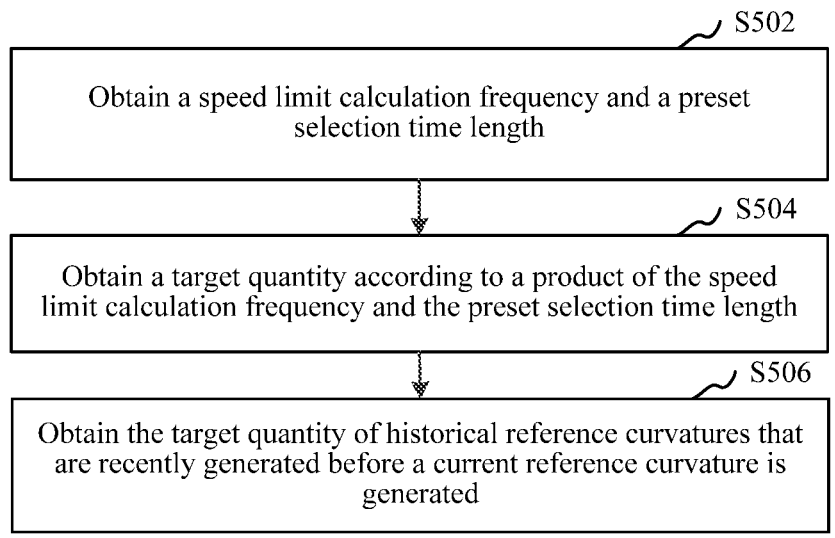
FIG. 5 is a schematic flowchart of a historical reference curvature obtaining step In one embodiment of this application.

As shown in FIG. 5, In one embodiment, the obtaining a historical reference curvature (the historical reference curvature obtaining step for short) specifically includes the following steps.

S502: Obtain a speed limit calculation frequency and a preset selection time length.

The speed limit calculation frequency is a frequency at which a speed limit is calculated. In one embodiment, the speed limit calculation frequency may consistent with a speed planning frequency. The speed planning frequency is a frequency at which a speed is planned. In one embodiment, the speed limit calculation frequency may be 10 Hz. That is, a speed limit is calculated 10 times per 1 s.

The preset selection time length is used to determine a selection range of the historical reference curvature. The computing device may select a historical reference curvature generated within a preset selection time length before a generation time of the current reference curvature. For example, if the preset selection time length is 1 s, the computing device may select a historical reference curvature generated within is before a generation time of the current reference curvature.

S504: Obtain a target quantity according to a product of the speed limit calculation frequency and the preset selection time length.

The target quantity is a quantity of historical reference curvatures to be selected.

In one embodiment, the computing device may directly use a product of the speed limit calculation frequency and the preset selection time length as a target quantity. It may be understood that, in this embodiment, the target quantity is also a quantity of historical reference curvatures generated within a preset selection time length before the generation time of the current reference curvature.

For example, if a speed limit calculation frequency is 10 Hz, and a preset selection time length is 1 s, a target quantity=10*1=10.

S506: Obtain the target quantity of historical reference curvatures that are recently generated before the current reference curvature is generated.

Specifically, the computing device may be select the first target quantity of generated historical reference curvatures before a current reference curvature is generated currently from the historical reference curvatures generated before the current reference curvature is generated. For example, if the target quantity is 10, the computing device may select the first one, the first two, . . . until the first ten generated historical reference curvatures before a current reference curvature is generated currently.

In the foregoing embodiment, a target quantity is obtained according to a product of the speed limit calculation frequency and the preset selection time length; and the target quantity of historical reference curvatures that are recently generated are obtained before the current reference curvature is generated. Then, the target curvature is determined according to an average value of the historical reference curvature and the current reference curvature. That is, an average value of the reference curvatures is calculated in a time dimension by using the speed limit calculation frequency, so that the final target curvature is an average value result in the time dimension, thereby further improving stability of the target curvature in the time dimension. Therefore, a speed limit determined according to a target curvature is more accurate, thereby preventing a sudden speed change.

Figure 6:
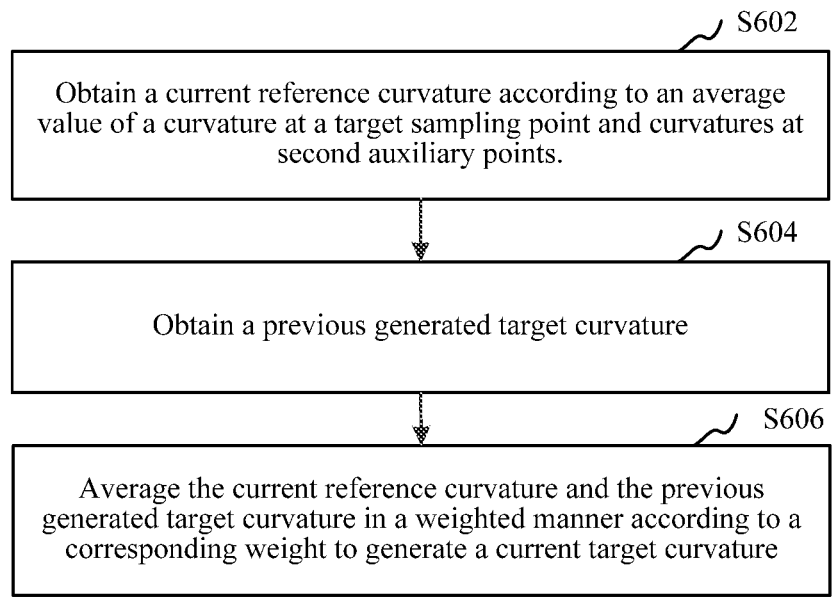
FIG. 6 is a schematic flowchart of a target curvature generating step In one embodiment of this application.

As shown in FIG. 6, In one embodiment, step S406 (the target curvature generating step for short) specifically includes the following steps.

S602: Obtain a current reference curvature according to an average value of the curvature at the target sampling point and the curvatures at the second auxiliary points.

In another embodiment, the computing device may directly use the obtained average value of the curvature at the target sampling point and the curvatures at the second auxiliary points as the current reference curvature.

Specifically, the computing device may obtain a sum of the curvature at the target sampling point and the curvatures at the second auxiliary points, and divide the sum by a quantity of the summed curvatures, to obtain current reference curvature.

S604: Obtain a previous generated target curvature.

The previous generated target curvature is a target curvature that is generated previous to current generation, that is, the target curvature generated during speed limit calculation previous to current calculation.

S606: Average the current reference curvature and the previous generated target curvature in a weighted manner according to a corresponding weight to generate a current target curvature.

In one embodiment, the computing device may generate a current target curvature according to the following formula:

$$K_{A\_now}=(1-a)*K_{A\_pre}+a*K_{R\_now},$$

where $K_{A\_now}$ represents the current target curvature, $K_{A\_pre}$ represents the previous generated target curvature, $K_{R\_now}$ represents the current reference curvature, and a is a weight of the current reference curvature.

In one embodiment, $a=1/H/T$, H is a speed limit calculation frequency, and T is a preset selection time length. It may be understood that as the number of iterations increases, a historical target curvature whose generation time is further from a current generation time has a smaller impact on generation of a current target curvature, and finally, a historical target curvature generated within approximately a preset selection time length T before the current generation can have a substantial impact on generation of the current target curvature. 1/H is a time length corresponding to generation of a current target curvature, and 1/H/T can reflect a proportion of a time length corresponding to the current generated target curvature to an approximately total time length of the historical target curvature having an impact on generation of the current target curvature, thereby determining a weight of a current reference curvature. In one embodiment, H=10 Hz, and T=1 s.

In the foregoing embodiment, in an iterative calculation manner, a previous generated target curvature serving as input, in combination with the current reference curvature, is averaged in a weighted manner according to a corresponding weight to generate a current target curvature. That is, with reference to average value calculation on the target curvature in a time dimension, a final target curvature is an average value result in the time dimension, thereby further improving stability of the target curvature in the time dimensional. Therefore, a speed limit determined according to a target curvature is more accurate, thereby preventing a sudden speed change.

Figure 7:
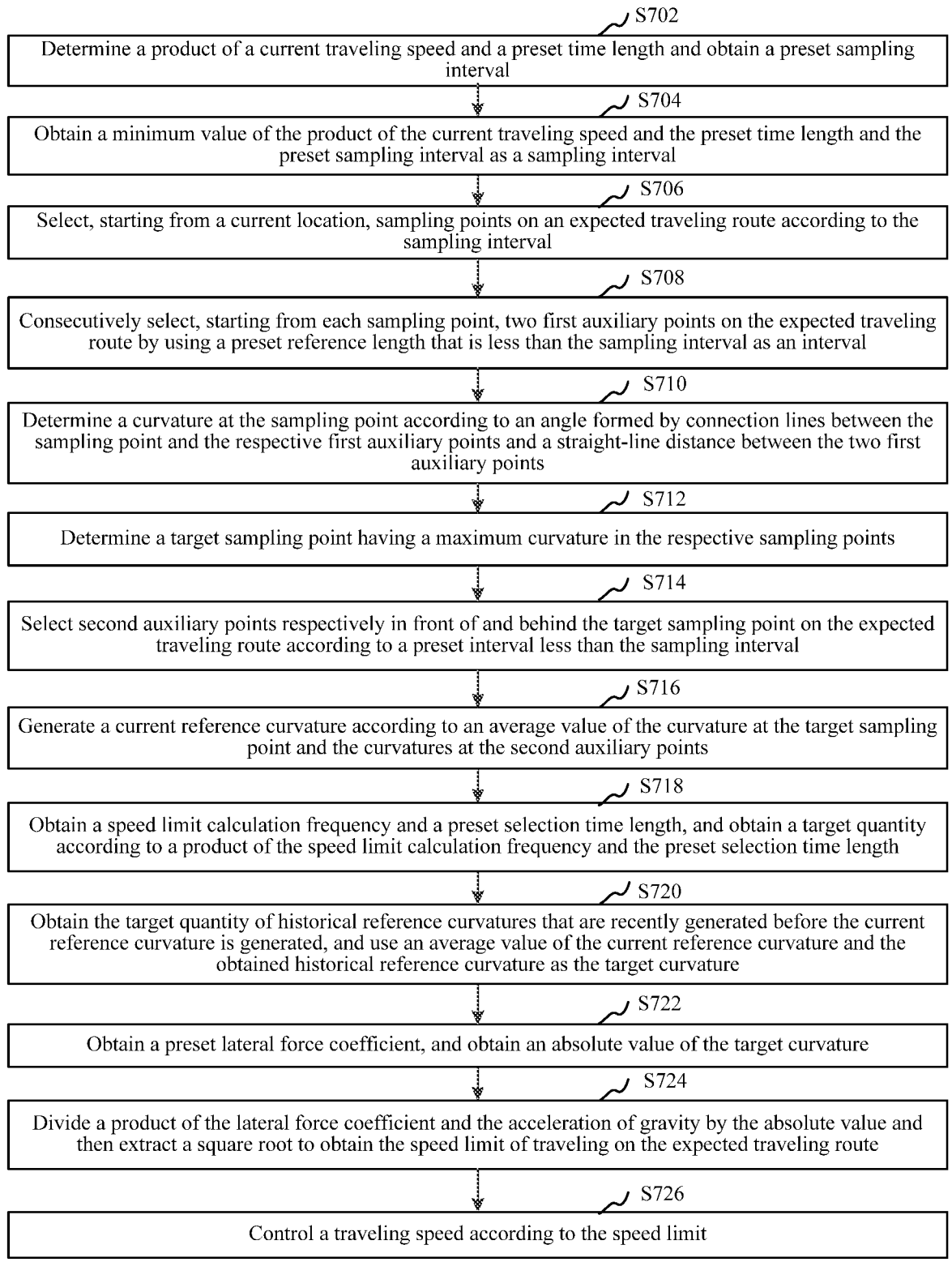
FIG. 7 is a schematic flowchart of a travel speed control method in another embodiment of this application.

As shown in FIG. 7, In one embodiment, another travel speed control method is provided, specifically including the following steps:

S702: Determine a product of a current traveling speed and a preset time length and obtain a preset sampling interval.

S704: Obtain a minimum value of the product of the current traveling speed and the preset time length and the preset sampling interval as a sampling interval.

S706: Select, starting from a current location, sampling points on an expected traveling route according to the sampling interval.

S708: For each sampling point, consecutively select, starting from the sampling point, two first auxiliary points on the expected traveling route by using a preset reference length that is less than the sampling interval as an interval.

S710: Determine a curvature at the sampling point according to an angle formed by connection lines between the sampling point and the respective first auxiliary points and a straight-line distance between the two first auxiliary points.

S712: Determine a target sampling point having a maximum curvature in the respective sampling points.

S714: Select second auxiliary points respectively in front of and behind the target sampling point on the expected traveling route according to a preset interval shorter than the sampling interval.

S716: Generate a current reference curvature according to an average value of the curvature at the target sampling point and the curvatures at the second auxiliary points.

S718: Obtain a speed limit calculation frequency and a preset selection time length, and obtain a target quantity according to a product of the speed limit calculation frequency and the preset selection time length.

S720: Obtain the target quantity of historical reference curvatures that are recently generated before the current reference curvature is generated, and use an average value of the current reference curvature and the obtained historical reference curvature as the target curvature.

S722: Obtain a preset lateral force coefficient, and obtain an absolute value of the target curvature.

S724: Divide a product of the lateral force coefficient and the acceleration of gravity by the absolute value of target curvature and then extract a square root to obtain the speed limit of traveling on the expected traveling route.

S726: Control a traveling speed according to the speed limit.

In the foregoing travel speed control method, the sampling interval matches the current traveling speed, and sampling points are selected on the expected traveling route according to the sampling interval, so that the sampling point are more likely to reflect requirements of travel speed control at the current traveling speed. Determining the target curvature according to the curvatures at the selected sampling point can better reflect a bending status of the expected traveling route, so that a corner can be found in advance, and further, a speed limit is determined according to a curvature of the corner, thereby accurately controlling a traveling speed and reducing sudden speed changes.

Second, by making two first auxiliary points, a relatively complex calculus curvature calculation method is converted into direct calculation between an angle and a distance, which simplifies processing steps and improves efficiency of obtaining curvatures at sampling points, thereby improving efficiency of driving speed control.

Then, a target curvature obtained with reference to the curvatures at the two auxiliary points in front and behind is more stable, and compared with a limitation of a curvature at a single sampling point, can reflect a bending status of a traveling route more accurately, so that a corner can be found in advance, an further, accurate travel speed control is achieved by determining a speed limit based on a curvature of the corner, thereby reducing sudden speed changes.

In addition, during target curvature calculation, a target curvature is determined with reference to the current reference curvature and the historical reference curvature or by obtaining an average value of the current reference curvature and the historical reference curvature, so that the determined target curvature is more stable, which, compared with a limitation of being monotonously based on the current reference curve, can reflect a bending status of a traveling route more accurately.

Finally, an average value of the reference curvatures is calculated in a time dimension by using the speed limit calculation frequency, so that the final target curvature is an average value result in the time dimension, thereby further improving stability of the target curvature in the time dimension. Therefore, a speed limit determined according to a target curvature is more accurate, thereby preventing a sudden speed change.

Figure 8:
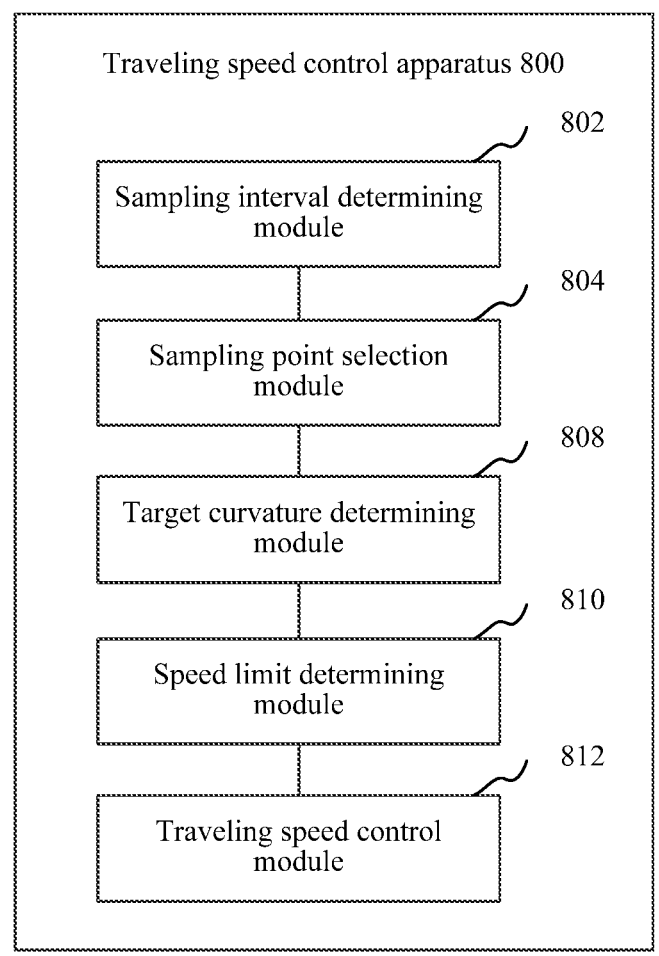
FIG. 8 is a block diagram of a travel speed control apparatus In one embodiment of this application.

As shown in FIG. 8, In one embodiment, a travel speed control apparatus 800 is provided. The apparatus 800 includes: a sampling interval determining module 802, a sampling point selection module 804, a target curvature determining module 808, a speed limit determining module 810, and a travel speed control module 812.

The sampling interval determining module 802 is configured to determine a sampling interval matching a current traveling speed.

The sampling point selection module 804 is configured to select, starting from a current location, sampling points on an expected traveling route according to the sampling interval.

The target curvature determining module 808 is configured to determine a target curvature according to curvatures of the expected traveling route at the respective sampling points.

The speed limit determining module 810 is configured to determine, according to the target curvature, a speed limit of traveling on the expected traveling route.

The travel speed control module 812 is configured to control a traveling speed according to the speed limit.

In one embodiment, the sampling interval determining module 802 is further configured to obtain a current traveling speed and a preset time length; and determine a sampling interval according to a product of the current traveling speed and the preset time length.

In one embodiment, the sampling interval determining module 802 is further configured to determine the product of the current traveling speed and the preset time length; obtain a preset sampling interval; and obtain a minimum value of the product of the current traveling speed and the preset time length and the preset sampling interval as the sampling interval.

Figure 9:
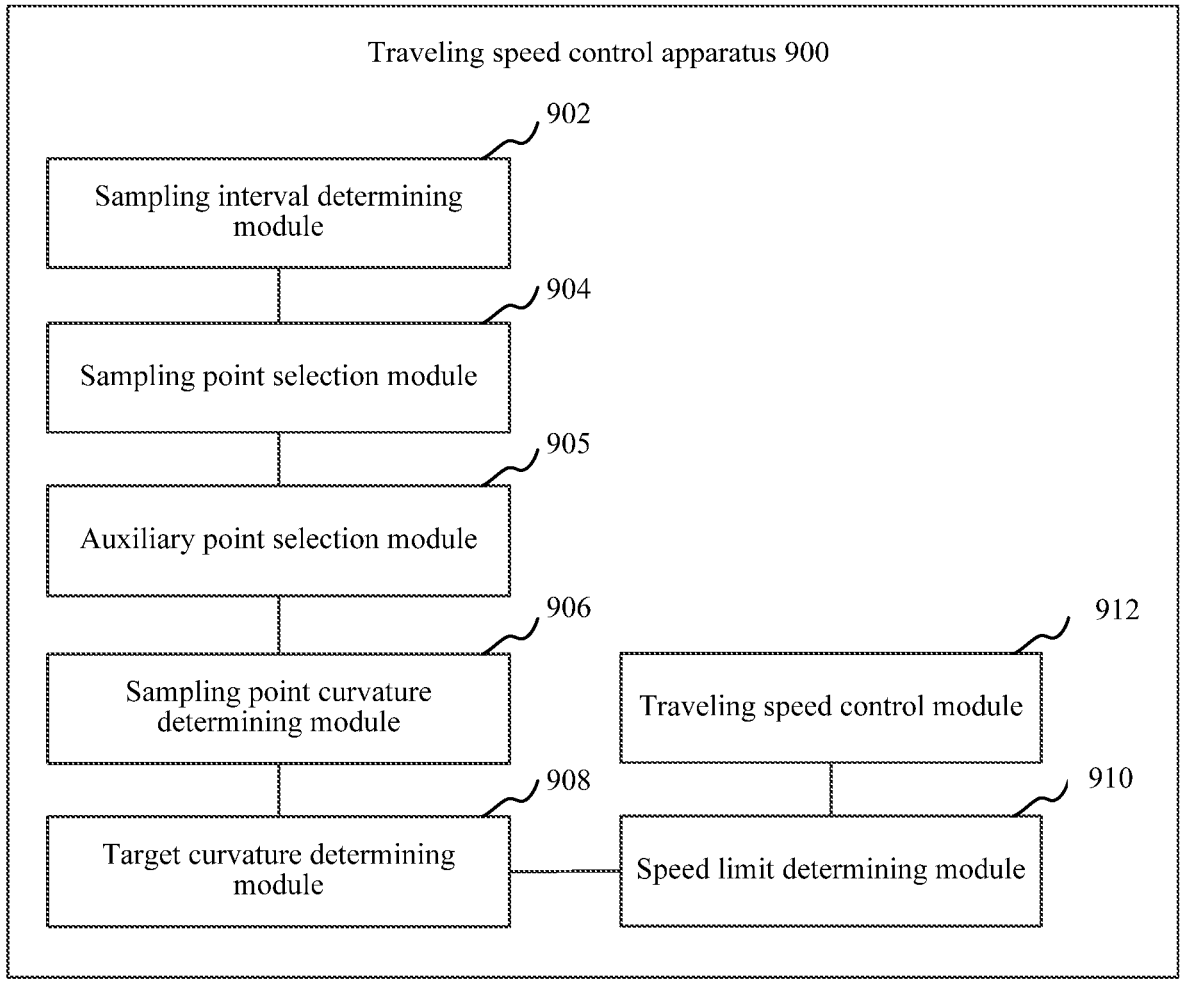
FIG. 9 is a block diagram of a travel speed control apparatus in another embodiment of this application.

As shown in FIG. 9, In one embodiment, a travel speed control apparatus 900 is provided. The apparatus 900 includes: a sampling interval determining module 902, a sampling point selection module 904, a target curvature determining module 908, a speed limit determining module 910, and a travel speed control module 912.

The sampling interval determining module 902 is configured to determine a sampling interval matching a current traveling speed.

The sampling point selection module 904 is configured to select, starting from a current location, sampling points on an expected traveling route according to the sampling interval.

The target curvature determining module 908 is configured to determine a target curvature according to curvatures of the expected traveling route at the respective sampling points.

The speed limit determining module 910 is configured to determine, according to the target curvature, a speed limit of traveling on the expected traveling route.

The travel speed control module 912 is configured to control a traveling speed according to the speed limit.

In one embodiment, the sampling interval determining module 902 is further configured to obtain a current traveling speed and a preset time length; and determine a sampling interval according to a product of the current traveling speed and the preset time length.

In one embodiment, the sampling interval determining module 902 is further configured to determine the product of the current traveling speed and the preset time length; obtain a preset sampling interval; obtain a minimum value of the product of the current traveling speed and the preset time length and the preset sampling interval as the sampling interval.

In some embodiments, the apparatus 900 further includes: an auxiliary point selection module 905, configured to: for each sampling point, consecutively select, starting from the sampling point, two first auxiliary points on the expected traveling route by using a preset reference length that is less than the sampling interval as an interval; and a sampling point curvature determining module 906, configured to determine a curvature at the sampling point according to an angle formed by connection lines between the sampling point and the respective first auxiliary points and a straight-line distance between the two first auxiliary points.

In one embodiment, the target curvature determining module 908 is further configured to determine a target sampling point having a maximum curvature in the respective sampling points; select second auxiliary points respectively in front of and behind the target sampling point on the expected traveling route according to a preset interval shorter than the sampling interval; and obtain the target curvature according to a curvature at the target sampling point and curvatures at the second auxiliary points.

In one embodiment, the target curvature determining module 908 is further configured to generate a current reference curvature according to an average value of the curvature at the target sampling point and the curvatures at the second auxiliary points; obtain a historical reference curvature; and use an average value of the current reference curvature and the obtained historical reference curvature as the target curvature.

In one embodiment, the target curvature determining module 908 is further configured to obtain a speed limit calculation frequency and a preset selection time length; obtain a target quantity according to a product of the speed limit calculation frequency and the preset selection time length; and obtain the target quantity of historical reference curvatures that are recently generated before the current reference curvature is generated.

In one embodiment, the target curvature determining module 908 is further configured to obtain a current reference curvature according to an average value of the curvature at the target sampling point and the curvatures at the second auxiliary points; obtain a previous generated target curvature; and average the current reference curvature and the previous generated target curvature in a weighted manner according to a corresponding weight to generate a current target curvature.

In one embodiment, the target curvature determining module 908 is further configured to generate the current target curvature according to the following formula:

$$K_{A\_now}=(1-a)*K_{A\_pre}+a*K_{R\_now},$$

where $K_{A\_now}$ represents the current target curvature, $K_{A\_pre}$ represents the previous generated target curvature, $K_{R\_now}$ represents the current reference curvature, and a is a weight of the current reference curvature.

In one embodiment, The speed limit determining module 910 is further configured to: obtain a preset lateral force coefficient; obtain an absolute value of the target curvature; and divide a product of the lateral force coefficient and the acceleration of gravity by the absolute value of the target curvature and then extracting a square root to obtain the speed limit of traveling on the expected traveling route.

Figure 10:
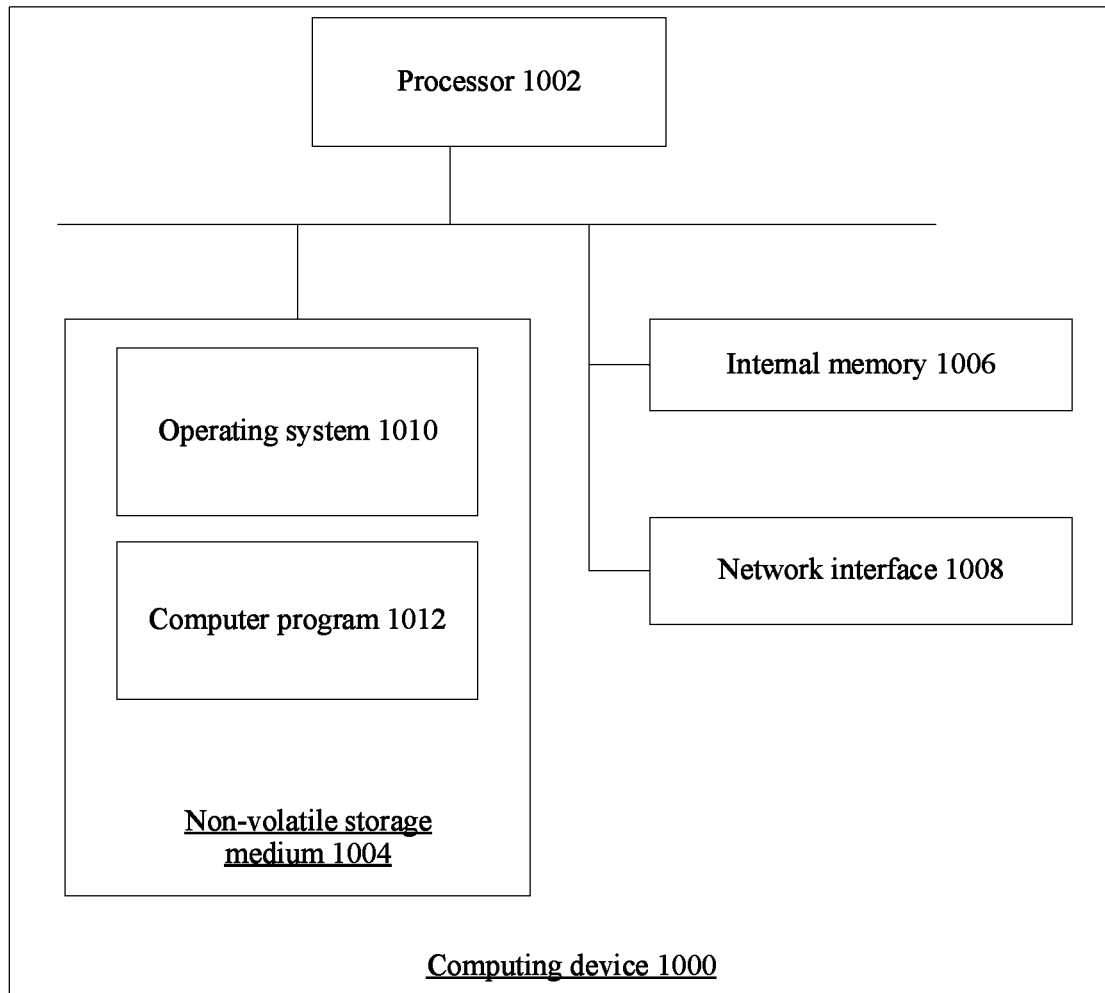
FIG. 10 is a schematic diagram of an inner structure of a computing device In one embodiment of this application.

FIG. 10 is a schematic diagram of an inner structure of a computing device In one embodiment. The computing device may be a terminal or a server. The terminal may be a personal computer or a mobile electronic device, including at least one of a mobile phone, a tablet computer, a personal digital assistant, wearable device, or the like. The server may be an independent server or implemented by using a server cluster including multiple physical servers. Referring to FIG. 10, the electronic device 1000 includes a processor 1002, a non-volatile storage medium 1004, an internal memory 1006, and a network interface 1008 that are connected through a system bus. The non-volatile storage medium 1004 of the computing device may store an operating system 1010 and a computer program 1012. The computer program 1012, when executed, may cause the processor to perform a travel speed control method. The processor 1002 of the computing device is configured to provide calculation and control capabilities, to support running of the entire computing device. The internal memory 1006 may store the computer program 1012. When executed by the processor 1002, the computer program 1012 may cause the processor 1002 to perform a travel speed control method. The network interface 1008 of the computing device is configured to perform network communication.

A person skilled in the art may understand that, the structure shown in FIG. 10 is merely a block diagram of a partial structure related to the solutions of this application, and does not constitute a limitation to the computing device to which the solutions of this application are applied, and a specific computing device may include more or fewer components than those shown in the figure, or some components may be combined, or a different component deployment may be used.

In one embodiment, the travel speed control apparatus provided by this application may be implemented in a form of a computer program. The computer program may run on the computing device 1000 shown FIG. 10, and the non-volatile storage medium of the computing device may store respective program modules constituting the travel speed control apparatus, for example, the sampling interval determining module 802, the sampling point selection module 804, the target curvature determining module 808, the speed limit determining module 810, and the travel speed control module 812, as shown in FIG. 8. The program modules may include one or more computer programs. The computer programs may be executed by one or more processors to cause the computing device to perform functions of the corresponding module and steps in the travel speed control method of each embodiment of this application described in this specification. For example, the computing device may determine, by using the sampling interval determining module 802 in the travel speed control apparatus 800 shown in FIG. 8, a sampling interval matching a current traveling speed; select, starting from a current location, sampling points on an expected traveling route according to the sampling interval by using the sampling point selection module 804; determine a target curvature according to curvatures at the respective sampling points by using the target curvature determining module 808; determine, according to the target curvature, a speed limit of traveling on the expected traveling route by using the speed limit determining module 810; and control a traveling speed according to the speed limit by using the travel speed control module 812.

In one embodiment, a computing device is provided, including: a memory and a processor, the memory storing a computer program, and the computer program, when executed by the processor, causing the processor to perform the following steps: determining a sampling interval matching a current traveling speed; selecting, starting from a current location, sampling points on an expected traveling route according to the sampling interval; determining a target curvature according to curvatures of the expected traveling route at the respective sampling points; determining, according to the target curvature, a speed limit of traveling on the expected traveling route; and controlling a traveling speed according to the speed limit.

In one embodiment, the determining a sampling interval matching a current traveling speed includes: obtaining a current traveling speed and a preset time length; and determining a sampling interval according to a product of the current traveling speed and the preset time length.

In one embodiment, the determining a sampling interval according to a product of the current traveling speed and the preset time length includes: determining the product of the current traveling speed and the preset time length; obtaining a preset sampling interval; and obtaining a minimum value of the product of the current traveling speed and the preset time length and the preset sampling interval as the sampling interval.

In one embodiment, before the determining a target curvature according to curvatures at the respective sampling points, the computer program further causes the processor to perform the following steps: for each sampling point, consecutively selecting, starting from the sampling point, two first auxiliary points on the expected traveling route by using a preset reference length that is less than the sampling interval as an interval; and determining a curvature at the sampling point according to an angle formed by connection lines between the sampling point and the respective first auxiliary points and a straight-line distance between the two first auxiliary points.

In one embodiment, the determining a target curvature according to curvatures at the respective sampling points includes: determining a target sampling point having a maximum curvature in the respective sampling points; selecting second auxiliary points respectively in front of and behind the target sampling point on the expected traveling route according to a preset interval shorter than the sampling interval; and obtaining the target curvature according to a curvature at the target sampling point and curvatures at the second auxiliary points.

In one embodiment, the obtaining the target curvature according to a curvature at the target sampling point and curvatures at the second auxiliary points includes: generating a current reference curvature according to an average value of the curvature at the target sampling point and the curvatures at the second auxiliary points; obtaining a historical reference curvature; and using an average value of the current reference curvature and the obtained historical reference curvature as the target curvature.

In one embodiment, the obtaining a historical reference curvature includes: obtaining a speed limit calculation frequency and a preset selection time length; obtaining a target quantity according to a product of the speed limit calculation frequency and the preset selection time length; and obtaining the target quantity of historical reference curvatures that are recently generated before the current reference curvature is generated.

In one embodiment, the obtaining the target curvature according to a curvature at the target sampling point and curvatures at the second auxiliary points includes: obtaining a current reference curvature according to an average value of the curvature at the target sampling point and the curvatures at the second auxiliary points; obtaining a previous generated target curvature; and averaging the current reference curvature and the previous generated target curvature in a weighted manner according to a corresponding weight to generate a current target curvature.

In one embodiment, the averaging the current reference curvature and the previous generated target curvature in a weighted manner according to a corresponding weight to generate a current target curvature includes: generating the current target curvature according to the following formula:

$$K_{A\_now}=(1-a)*K_{A\_pre}+a*K_{R\_now}, \text{ where}$$

$K_{A\_now}$ represents the current target curvature, $K_{A\_pre}$ represents the previous generated target curvature, $K_{R\_now}$ represents the current reference curvature, and a is a weight of the current reference curvature.

In one embodiment, the determining, according to the target curvature, a speed limit of traveling on the expected traveling route includes: obtaining a preset lateral force coefficient; obtaining an absolute value of the target curvature; and dividing a product of the lateral force coefficient and the acceleration of gravity by the absolute value of the target curvature and then extracting a square root to obtain the speed limit of traveling on the expected traveling route.

In one embodiment, a storage medium storing a computer program is further provided, the computer program, when executed by one or more processors, causing the one or more processors to perform the following steps: determining a sampling interval matching a current traveling speed; selecting, starting from a current location, sampling points on an expected traveling route according to the sampling interval; determining a target curvature according to curvatures of the expected traveling route at the respective sampling points; determining, according to the target curvature, a speed limit of traveling on the expected traveling route; and controlling a traveling speed according to the speed limit.

In one embodiment, the determining a sampling interval matching a current traveling speed includes: obtaining a current traveling speed and a preset time length; and determining a sampling interval according to a product of the current traveling speed and the preset time length.

In one embodiment, the determining a sampling interval according to a product of the current traveling speed and the preset time length includes: determining the product of the current traveling speed and the preset time length; obtaining a preset sampling interval; obtaining a minimum value of the product of the current traveling speed and the preset time length and the preset sampling interval as the sampling interval.

In one embodiment, before the determining a target curvature according to curvatures at the respective sampling points, the computer program further causes the processor to perform the following steps:

for each sampling point, consecutively selecting, starting from the sampling point, two first auxiliary points on the expected traveling route by using a preset reference length that is less than the sampling interval as an interval; and determining a curvature at the sampling point according to an angle formed by connection lines between the sampling point and the respective first auxiliary points and a straight-line distance between the two first auxiliary points.

In one embodiment, the determining a target curvature according to curvatures at the respective sampling points includes: determining a target sampling point having a maximum curvature in the respective sampling points; selecting second auxiliary points respectively in front of and behind the target sampling point on the expected traveling route according to a preset interval shorter than the sampling interval; and obtaining the target curvature according to a curvature at the target sampling point and curvatures at the second auxiliary points.

In one embodiment, the obtaining the target curvature according to a curvature at the target sampling point and curvatures at the second auxiliary points includes: generating a current reference curvature according to an average value of the curvature at the target sampling point and the curvatures at the second auxiliary points; obtaining a historical reference curvature; and using an average value of the current reference curvature and the obtained historical reference curvature as the target curvature.

In one embodiment, the obtaining a historical reference curvature includes: obtaining a speed limit calculation frequency and a preset selection time length; obtaining a target quantity according to a product of the speed limit calculation frequency and the preset selection time length; and obtaining the target quantity of historical reference curvatures that are recently generated before the current reference curvature is generated.

In one embodiment, the obtaining the target curvature according to a curvature at the target sampling point and curvatures at the second auxiliary points includes: obtaining a current reference curvature according to an average value of the curvature at the target sampling point and the curvatures at the second auxiliary points; obtaining a previous generated target curvature; and averaging the current reference curvature and the previous generated target curvature in a weighted manner according to a corresponding weight to generate a current target curvature.

In one embodiment, the averaging the current reference curvature and the previous generated target curvature in a weighted manner according to a corresponding weight to generate a current target curvature includes: generating the current target curvature according to the following formula:

$$K_{A\_now} = (1-a)*K_{A\_pre} + a*K_{R\_now}, \text{ where}$$

$K_{A\_now}$ represents the current target curvature, $K_{A\_pre}$ represents the previous generated target curvature, $K_{R\_now}$ represents the current reference curvature, and a is a weight of the current reference curvature.

In one embodiment, the determining, according to the target curvature, a speed limit of traveling on the expected traveling route includes: obtaining a preset lateral force coefficient; obtaining an absolute value of the target curvature; and dividing a product of the lateral force coefficient and the acceleration of gravity by the absolute value of the target curvature and then extracting a square root to obtain the speed limit of traveling on the expected traveling route.

A person of ordinary skill in the art should understand that all or a part of the processes of the method in the foregoing embodiment may be implemented by a program instructing relevant hardware. The program may be stored in a computer readable storage medium. When the program is run, the processes of the method in the foregoing embodiment are performed. The storage medium may be a non-volatile storage medium such as a magnetic disk, an optical disc, or a read-only memory (ROM), or may be a random access memory (RAM) or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A travel speed control method, implemented on a computer and comprising:
    determining a sampling interval according to a current traveling speed by:
        obtaining the current traveling speed and a length of time;
        determining a product of the current traveling speed and the length of time;
        obtaining a preset sampling interval; and
        obtaining a minimum value of the product of the current traveling speed and the length of time and the preset sampling interval as the sampling interval;
    selecting, starting from a current location, sampling points on an expected traveling route according to the sampling interval, wherein the sampling points include a first, a second, and a third sampling points, the second sampling point is distanced from the first sample point by the sampling interval, and the third sampling point is distanced from the second sampling point by the sampling interval;
    determining a target curvature according to curvatures of the expected traveling route at the sampling points, wherein a curvature of the expected traveling route at the first sampling point of the sample points is determined by:
        starting from the first sampling point, selecting two first auxiliary points (first auxiliary point A and first auxiliary point B) on the expected traveling route, the two first auxiliary points are distanced from each other by a reference length that is shorter than the sampling interval; and
        determining the curvature at the first sampling point according to an angle formed by a connection line between the first sampling point and the first auxiliary point A, and a connection line between the first sampling point and the first auxiliary point B;
    determining, according to the target curvature, a speed limit of traveling on the expected traveling route; and
    controlling a traveling speed according to the speed limit.

2. The method according to claim 1, wherein determining the target curvature according to the curvatures at the sampling points comprises:
    determining a target sampling point having a maximum curvature at the sampling points;
    selecting second auxiliary points respectively in front of and behind the target sampling point on the expected traveling route according to an interval shorter than the sampling interval; and
    obtaining the target curvature according to a curvature at the target sampling point and curvatures at the second auxiliary points.

3. The method according to claim 2, wherein obtaining the target curvature according to the curvature at the target sampling point and the curvatures at the second auxiliary points comprises:
    generating a current reference curvature according to an average value of the curvature at the target sampling point and the curvatures at the second auxiliary points;
    obtaining a historical reference curvature; and
    using an average value of the current reference curvature and the historical reference curvature as the target curvature.

4. The method according to claim 3, wherein obtaining the historical reference curvature comprises:
    obtaining a speed limit calculation frequency and a selection time length;
    obtaining a target quantity of historical reference curvatures according to a product of the speed limit calculation frequency and the selection time length; and
    selecting the historical reference curvature from the target quantity of historical reference curvatures.

5. The method according to claim 2, wherein obtaining the target curvature according to the curvature at the target sampling point and the curvatures at the second auxiliary points comprises:

obtaining a current reference curvature according to an average value of the curvature at the target sampling point and the curvatures at the second auxiliary points;
obtaining a previously generated target curvature; and
averaging the current reference curvature and the previously generated target curvature to generate the target curvature.

6. The method according to claim 1, wherein determining the speed limit of traveling on the expected traveling route comprises:
obtaining a lateral force coefficient;
obtaining an absolute value of the target curvature; and
dividing a product of the lateral force coefficient and the acceleration of gravity by the absolute value of the target curvature and then extracting a square root to obtain the speed limit of traveling on the expected traveling route.

7. The method according to claim 1, wherein the current traveling speed falls within a range of traveling speeds, and each travel speed within the range corresponds to the preset sampling interval.

8. A travel speed control apparatus, comprising: a memory storing computer program instructions; and a processor coupled to the memory and configured to execute the computer program instructions and perform:
determining a sampling interval according to a current traveling speed by:
obtaining the current traveling speed and a length of time;
determining a product of the current traveling speed and the length of time;
obtaining a preset sampling interval; and
obtaining a minimum value of the product of the current traveling speed and the length of time and the preset sampling interval as the sampling interval;
selecting, starting from a current location, sampling points on an expected traveling route according to the sampling interval, wherein the sampling points include a first, a second, and a third sampling points, the second sampling point is distanced from the first sample point by the sampling interval, and the third sampling point is distanced from the second sampling point by the sampling interval;
determining a target curvature according to curvatures of the expected traveling route at the sampling points, wherein a curvature of the expected traveling route at the first sampling point of the sample points is determined by:
starting from the first sampling point, selecting two first auxiliary points first auxiliary point A and first auxiliary point B) on the expected traveling route, the two first auxiliary points are distanced from each other by a reference length that is shorter than the sampling interval; and
determining the curvature at the first sampling point according to an angle formed by a connection line between the first sampling point and the first auxiliary point A, and a connection line between the first sampling point and the first auxiliary point B;
determining, according to the target curvature, a speed limit of traveling on the expected traveling route; and
controlling a traveling speed according to the speed limit.

9. The apparatus according to claim 8, wherein the processor is further configured to execute the computer program instructions and perform:
determining a target sampling point having a maximum curvature at the sampling points;
selecting second auxiliary points respectively in front of and behind the target sampling point on the expected traveling route according to an interval shorter than the sampling interval; and
obtaining the target curvature according to a curvature at the target sampling point and curvatures at the second auxiliary points.

10. A vehicle with a travel speed control apparatus, the travel speed control apparatus comprising: a memory storing computer program instructions; and a processor coupled to the memory and configured to execute the computer program instructions and perform:
determining a sampling interval according to a current traveling speed of the vehicle by:
obtaining the current traveling speed and a length of time;
determining a product of the current traveling speed and the length of time;
obtaining a preset sampling interval; and
obtaining a minimum value of the product of the current traveling speed and the length of time and the preset sampling interval as the sampling interval;
selecting, starting from a current location, sampling points on an expected traveling route according to the sampling interval, wherein the sampling points include a first, a second, and a third sampling points, the second sampling point is distanced from the first sample point by the sampling interval, and the third sampling point is distanced from the second sampling point by the sampling interval;
determining a target curvature according to curvatures of the expected traveling route at the sampling points, wherein a curvature of the expected traveling route at the first sampling point of the sample points is determined by:
starting from the first sampling point, selecting two first auxiliary points first auxiliary point A and first auxiliary point B) on the expected traveling route, the two first auxiliary points are distanced from each other by a reference length that is shorter than the sampling interval; and
determining the curvature at the first sampling point according to an angle formed by a connection line between the first sampling point and the first auxiliary point A, and a connection line between the first sampling point and the first auxiliary point B;
determining, according to the target curvature, a speed limit of traveling on the expected traveling route for the vehicle; and
controlling a traveling speed of the vehicle according to the speed limit.

11. The vehicle of claim 10, wherein processor is further configured to execute the computer program instructions and perform:
determining a target sampling point having a maximum curvature at the sampling points;
selecting second auxiliary points respectively in front of and behind the target sampling point on the expected traveling route according to an interval shorter than the sampling interval; and
obtaining the target curvature according to a curvature at the target sampling point and curvatures at the second auxiliary points.

12. The vehicle of claim 11, wherein the processor is further configured to execute the computer program instructions and perform:

obtaining a current reference curvature according to an average value of the curvature at the target sampling point and the curvatures at the second auxiliary points;
obtaining a previously generated target curvature; and
averaging the current reference curvature and the previously generated target curvature to generate the target curvature.

13. The vehicle of claim 10, wherein the processor is further configured to execute the computer program instructions and perform:
obtaining a lateral force coefficient;
obtaining an absolute value of the target curvature; and
dividing a product of the lateral force coefficient and the acceleration of gravity by the absolute value of the target curvature and then extract a square root to obtain the speed limit.

* * * * *